July 29, 1958 — L. K. BREELER — 2,845,278
LUGGAGE CART AND DISPENSER
Filed Jan. 5, 1953 — 3 Sheets-Sheet 1
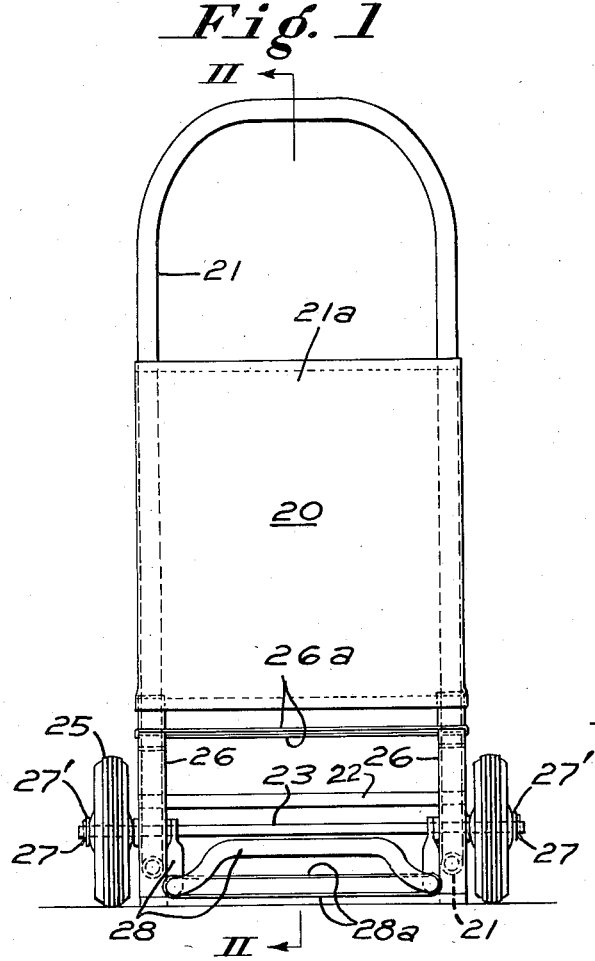
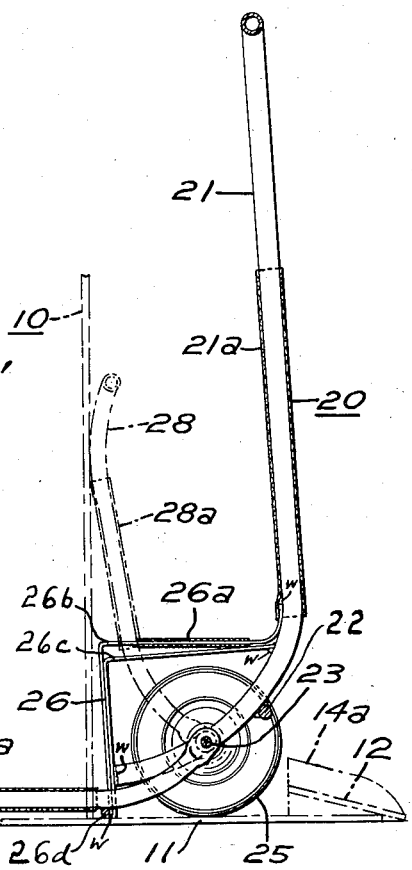
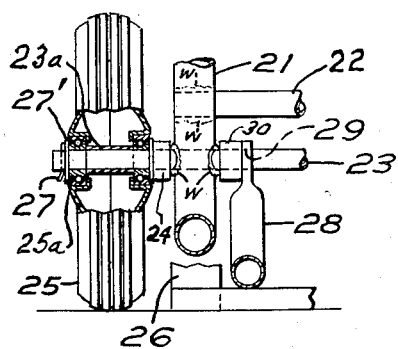
INVENTOR.
LENORE K. BREELER
BY Green, McCallister & Miller
Her attorneys July 29, 1958 L. K. BREELER 2,845,278
LUGGAGE CART AND DISPENSER
Filed Jan. 5, 1953 3 Sheets-Sheet 2
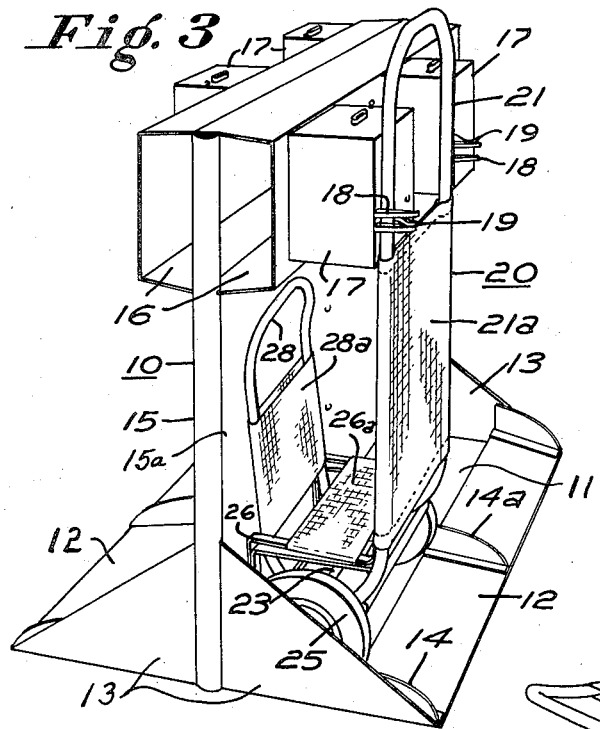
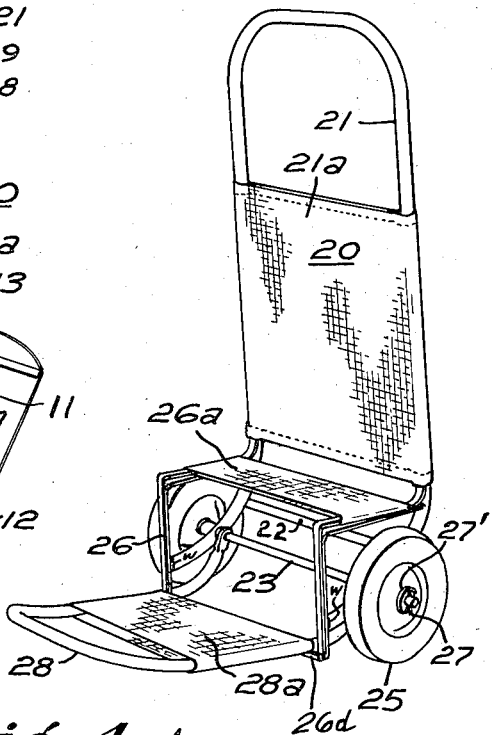
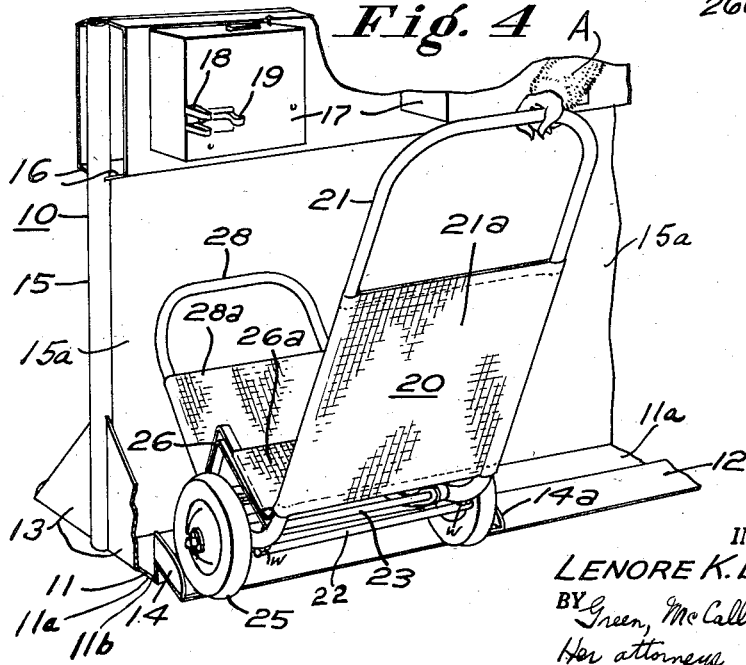
INVENTOR.
LENORE K. BREELER July 29, 1958  L. K. BREELER  2,845,278
LUGGAGE CART AND DISPENSER
Filed Jan. 5, 1953  3 Sheets-Sheet 3
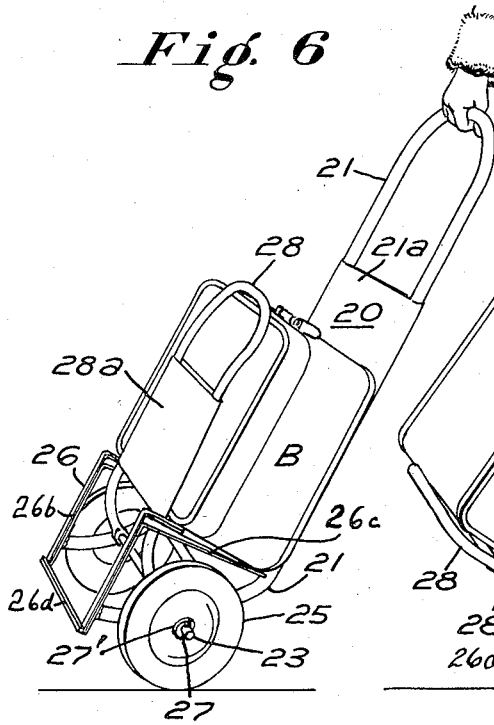
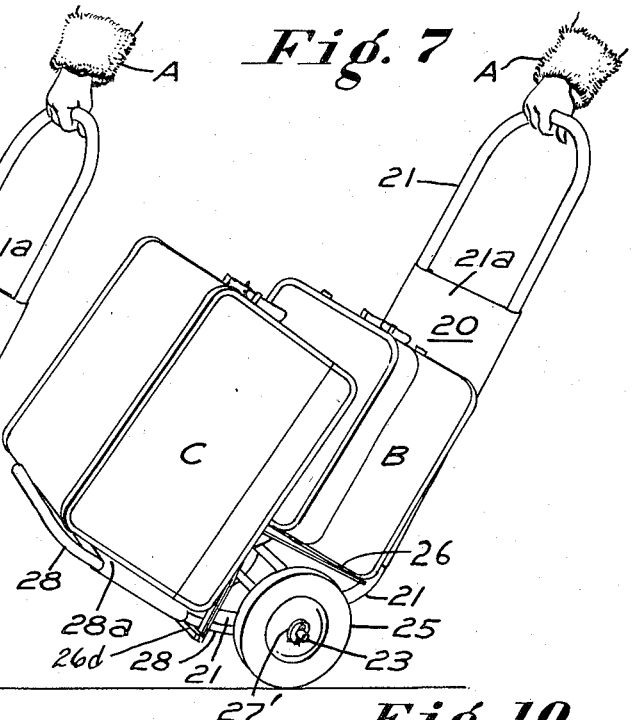
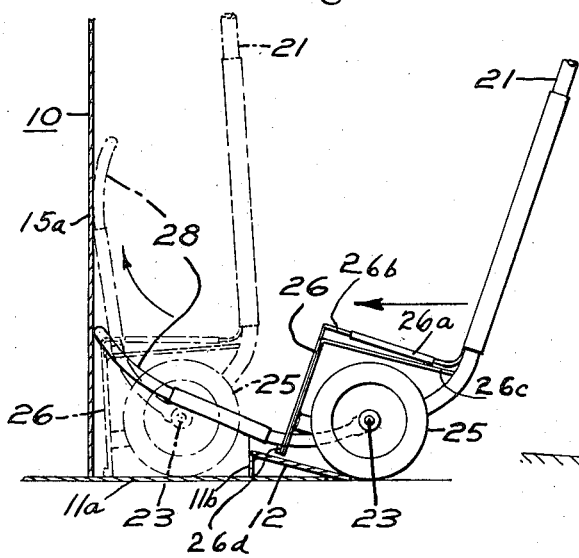
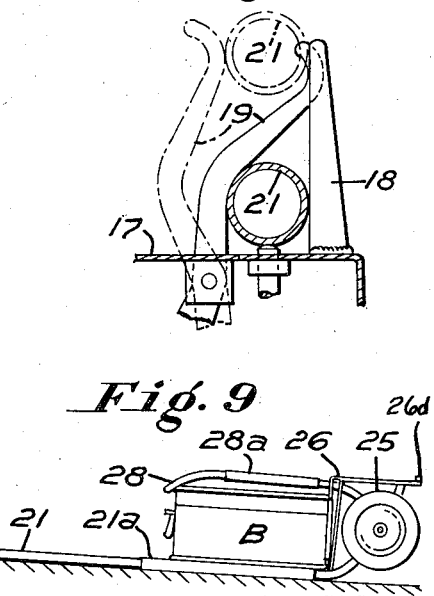
INVENTOR.
LENORE K. BREELER
BY Green, McCallister & Miller
Her attorneys United States Patent Office 2,845,278
Patented July 29, 1958

2,845,278
LUGGAGE CART AND DISPENSER
Lenore K. Breeler, Fredonia, N. Y.
Application January 5, 1953, Serial No. 329,570
14 Claims. (Cl. 280—36)

This invention relates to a system for servicing luggage, to a dispensing system for luggage carts, to an improved luggage cart for use at railway stations, etc. and particularly, to a luggage cart suitable for a dispensing unit or apparatus of a luggage servicing system.

Reference is made to my application for United States Letters Patent No. 278,984, filed March 27, 1952, and entitled Luggage Carrier, and since issued as Patent No. 2,753,970. In my copending application, I have outlined the problem involved in handling of luggage under present-day conditions and the need for a dispensing system suitable for ready usage by travelers.

The present application deals particularly with the problem of an improved luggage cart or carrier construction that may be employed in connection with a dispensing unit, and to an improved dispensing frame for collapsing and properly aligning luggage carts of my construction. I have determined that the need is for a fool-proof type of cart or luggage carrier which will be readily adaptable for carrying one or more pieces of luggage, which will be collapsible for ready storage and position-locking in a dispensing frame or unit, which will be simple and light weight in construction and easy to operate, which can be readily handled, loaded, and unloaded, and which will not have a tendency to run away when it is accidentally knocked over. I have been able to devise a luggage cart which meets all of these factors and has other advantageous features. It is of a construction that essentially lends itself to utilization in connection with a dispensing unit or as a part of a luggage servicing system.

It has thus been an object of my invention to provide a system for solving the luggage problem at railroad stations and other places.

Another object has been to provide an improved dispensing system for luggage carts and particularly, to provide an improved luggage cart and frame or rack for use in connection with or as a part of a luggage servicing and cart dispensing system.

These and many other objects of my invention will appear to those skilled in the art from the description thereof and the drawings.

In the drawings,

Figure 1 is a vertical view in elevation of a luggage cart or carrier of my present invention showing its swing frame in a full, forwardly-projecting or extending position;

Figure 1A is an enlarged sectional and fragmental detail in elevation taken in the same direction as Figure 1 and more specifically illustrating constructional features of the cart of Figure 1;

Figure 2 is a sectional view in elevation taken along the line II—II of and on the same scale as Figure 1; the full lines disclose an extended position of the swing frame and the dot and dash lines disclose how the swing frame may be collapsed by moving or pushing the cart into a dispensing frame or unit;

Figure 3 is a perspective side view in elevation of a complete system of my construction illustrating a collapsed and locked position of a luggage cart of my construction when mounted in a dispensing frame or unit of my construction;

Figure 4 is a fragmental front perspective view in elevation of the system of Figure 3 and showing a preliminary position of the luggage cart of Figure 1 when it is being moved into a final, locked and stacked position with respect to the dispensing frame or unit;

Figure 5 is a front perspective view in elevation of the luggage cart of Figure 1 with its swing frame in the extended position of Figure 1;

Figure 6 is a side perspective view in elevation illustrating one manner of utilizing the luggage cart of Figures 1 and 5 with its swing frame in a collapsed relationship and Figure 7 is a similar view illustrating its utilization with the swing frame in its extended relationship to support additional luggage;

Figure 8 is a fragmental side sectional view in elevation further illustrating the operations of Figures 3 and 4; the full line position of the luggage carrier or cart corresponds to the position of Figure 4 and the dot and dash position corresponds to the position of Figure 3;

Figure 9 is a side view in elevation of the luggage cart of Figures 1 and 5 on a reduced scale, showing it in a tipped-over position on the floor or the ground and thus, illustrating a safety feature of its construction, wherein there is no danger of the cart running away on a sloped surface when it is accidentally upset;

Figure 10 is a horizontal sectional detail showing how a handle of the luggage cart is locked and unlocked at the stacked position of Figure 3; this figure is on a greatly enlarged scale and its full lines represent a fully locked position of the luggage cart with respect to a coin-operated latching mechanism and its dot and dash lines indicate an unlocked position, such as occurs when the cart is being removed or entered between latching fingers of the mechanism.

Referring particularly to Figures 2, 3, 4, and 10, I have provided a dispensing frame, rack or unit 10 having a series of coin-operated latching mechanisms or boxes 17 mounted thereon and in combination, constructed to receive and dispense a series of luggage carts or carriers 20. The unit 10 may be of a stationary type, or as shown in my copending application, may be provided with casters or wheels for more readily moving it from one dispensing location to another.

The dispensing frame or unit 10 has a pair of transversely-oppositely and outwardly-extending, front and back bottom plate mmebers 11, each of which, as shown particularly in Figure 4, has a planar inner, bottom or step portion 11a and an intermediate, vertical or riser portion 11b that define a longitudinally-extending trough or valley for receiving and retaining a pair of wheels 25 of the luggage cart 20. The riser portion 11b of each floor member 11 is connected to an outwardly-downwardly sloped runway portion 12. Longitudinally spaced-apart vertical side ear portions or pieces 14 and 14a are secured to extend upwardly from the portion 12 and end or side closures or flange portions 13 are secured to and extend from upright members or posts 15 and along side ends of the bottom plate member 11 to positively guide and retain the pair of wheels 25, so that the handle portion of a frame 21 of each luggage cart 20 is in proper alignment with latching fingers 18 and 19 of the coin-operated mechanism 17, and so that the cart 20 cannot be removed sideways from the unit 10. The guide ears 14 and 14a have a spacing that is slightly greater than the spacing between the wheels 25, so that each cart 20 can be freely entered and removed from its stall, as defined by the flange portions 13 and the trough-like portion of the floor member 11.

The frame of the unit 10 has a pair of vertically-extending end or side tubes or upright members 15 and a backing plate 15a which are welded to the bottom plate member 11. The structure is further reinforced by the closure portions 13. A pair of channel-shaped, rectangular-box-defining members 16 are secured, as by welding, to extend longitudinally between the upright members 15 and to support the upper portion of the backing plate member 15a.

Individual, coin-operated mechanisms or boxes 17 are secured to extend transversely-outwardly from opposite sides of the rectangular box provided by the members 15 and are mounted in a longitudinally spaced-apart relationship to properly align with each stall and receive and lock the handle of each luggage cart 20 which is to be stored in position in the unit 10. Each mechanism 17 may be of the type set forth in my copending application and may have one or more fixed-positioned fingers 18 and a pivoted or swing finger 19 which is operated to latch and unlatch the handle portion of each luggage cart 20, see particularly Figure 10. Also, as shown in my copending application, a key may be carried by the cart to engage and actuate the mechanism.

Referring particularly to Figures 1 to 8, inclusive, the luggage cart 20 has a normally vertically-positioned, main frame part 21 that defines a handle for the cart and as shown, has a U-shaped tubular construction. The frame parts of the luggage cart 20 are made of a light-weight metal, such as aluminum or magnesium, or of light-weight steel and principally, of tubular construction to provide strength and save all possible weight.

The bottom portion of the frame part 21 may, as shown particularly in Figures 4 and 5, be reinforced by a cross member of tubular construction 22, welded at its ends thereto. I have employed w, see Figures 1A, 2 and 5, as a general reference for weld metal. The front portion of the main frame 21, as shown particularly in Figure 5, is curved forwardly and is welded or secured at its bottom ends to a secondary shelf frame or stand 26 to provide a unitary construction. The shelf frame 26 may be of a single thickness or member construction, although as shown, it has pairs of angle-shaped members 26b and 26c which extend forwardly and downwardly of the frame 21 to define the step. The front end portions of the members 26b and 26c are integrally secured to a transverse member or piece 26d that, as shown in Figure 2, serves as a floor rest to position the cart 20 in a stationary or standing position that is substantially vertically upright. The front riser portions of the members 26b and 26c lie in an abutting relationship, while the step, or shelf portion of the members 26b and 26c thereof have a vertically spaced relationship, as shown in Figures 2 and 8, to facilitate the mounting and replacement of a suitable cross piece 26a. The inner end portion of each member 26c is welded at its end to the main frame 21 and the like portion of each member 26b is curved upwardly and also welded to the main frame 21 (see Figure 2).

As shown, the secondary frame 26 has transversely spaced-apart pairs of side pieces or members constructed from the members 26b and 26c that define (see Figure 5) forwardly-open portions through which swing frame 28 extends and within which it swings from the open position of Figure 5 to the closed or collapsed position of Figure 3. Also, as shown, the side members or pieces of the secondary frame 26 define a shelf or step portion that projects forwardly above and beyond axle shaft 23 and wheels 25 and which has a substantially horizontal position when the cart 20 is in its stationary upright position of Figure 2.

A forward riser portion of 26 projects at substantially right angles to the shelf portion and substantially vertically or downwardly when the cart 20 is in the position of Figure 2. The riser portion extends in front of the axle shaft 23 and wheels 25 for their full diametric depth to a position that lies substantially on a floor level plane of the wheels 25. Thus, as reinforced by the cross member 26d, the riser portion rests upon the floor for supporting the cart in an upright position, see also Figure 2.

The second or front frame 26 of flat metal construction serves both as a stand and a shelf frame for the cart 20 and permits the cart, as disclosed in Figure 2, to rest, manually unsupported, on member 26d when luggage is being loaded. Further, as shown in Figure 9, the frame 26 and the frame 20 make it impossible for the wheels 25 to engage the ground or floor when the cart is accidentally upset, either forwardly or backwardly. This is particularly advantageous as a safety factor from the standpoint that the cart 20 cannot run away when it is accidentally upset.

As shown particularly in Figures 1, 1A, 2 and 5, an axle shaft 23 extends transversely through, outwardly of forwardly-curved bottom portions of the frame 21, and is integrally secured thereto as by welding W. A pair of wheels 25 are rotatably mounted on outwardly-extending end portions of the shaft 23. Bearing sleeves 23a are carried by the shaft 23 and with hub portions of each wheel, carry friction bearings 25a. A spacer collar 24, washers 27', and cotter pins 27 complete the assembly of each wheel 25.

It will be noted that the wheels are also of light-weight construction and are provided with rubber tires that may be of an inflated or pneumatic type. The cart 20, as shown particularly in Figures 1 to 8, inclusive, has a swing frame 28 that is also shown as of U-shaped tubular construction. The swing frame 28 is curved upwardly at its back end portions or arms that are flattened and have holes therethrough for pivotally mounting them on the axle shaft 23 against spacer sleeves 30, see particularly Figures 1A, 2 and 5. The front end portion of the swing frame 28 is also upturned or curved upwardly to facilitate or provide for the automatic collapsing or folding operation, illustrated is Figures 4 and 8. It will be noted that the arms of the swing frame 28 extend through the transverse spacing provided by side portions of the secondary frame 26, so that the transverse member 26d of the latter frame will limit the forward or downward swing of the frame 28 to the substantially horizontal position of Figure 5 to, as shown in Figure 7, receive additional luggage C over and above luggage, such as B, which is positioned on the secondary frame 26.

As disclosed particularly in Figures 1, 2, 4 and 5, each of the frames 21, 26 and 28 is provided with luggage support, transverse supports or closures 21a, 26a and 28a, respectively, that may be of fabric, canvas, or wire screening and preferably, of canvas to provide strength and prevent damage to the luggage. The pieces 21a, 26a and 28a are secured in the form of envelopes in position and may be readily replaced when they loss their life or wear out. This feature of the construction further lightens the overall weight of the cart.

The swing frame 28 may, as shown in Figure 6, be manually folded against one or more pieces of luggage, such as B, that are being carried on the main frame 21 or may, as shown in Figure 7, be extended to carry additional luggage, such as C. These figures illustrate the normal, vertically-inclined position of the cart 20 with the center of gravity of the luggage falling directly on the axis of the wheels 25 which rotate about the axle 23. As a result, only a minimum effort needs to be exerted by the hand A of the user in moving the luggage from one location to another. The cart is easily loaded and unloaded, since it supports itself in the vertical position of Figure 5, leaving the hands of the user free to handle the luggage. In other words, the cart construction and operation is such that it lends itself readily to one person usage.

The construction of the system is such that a cart 20, after usage, can be run into an empty stall of a conveniently located frame unit 10 (there will usually be one at the driveway and one at the train loading platform of a station) without any worry as to its proper alignment in such stall, and in such a manner that its handle portion will automatically be locked by the fingers 18 and 19 of the coin mechanism 17 (see my copending application as to the operation of the mechanism 17). The user does not have to bother to fold the swing frame 28 back, as this is accomplished automatically, as shown in Figures 4 and 8, by pushing and advancing the cart against the back wall member 15a of the unit 10. The stall construction is such that a cart 20 cannot be removed without inserting a coin in the mechanism 17 by, for example, attempting to raise, lower, or maneuver the cart in some way out of position between the fingers 17 and 18. The closed-end construction of the handle portion of the cart provides further assurance in this connection, as does the side portions 13, and the trough-like construction of the bottom plate 11 of the stall of the dispensing unit 10.

The perfect balance of the cart 20 is such as to keep or retain the luggage in position and to make possible wheeling with a minimum of effort. The cart may also be moved up and down steps. If desired, the swing frame 28 may be relatively loosely mounted on the axle 23 to normally swing to its extended position when the cart 20 is removed from its stall.

I have provided a system for servicing luggage and packages which employs at least one, and in larger stations, pairs of luggage cart dispensing units, so that one unit may be located near a local transportation platform and a second may be located for example, near a railway platform of the station. Each dispensing unit provides at least one stall for storing a luggage cart and has a coin-operated latching mechanism that positively locks or latches to hold a handle portion of the cart and retain the cart in the stall until a coin is inserted to release its holding action. The latching mechanism is automatically actuated by the return of a cart to the stall to again lock its fingers about the handle portion of the cart. The stall of the dispensing unit has a backing member or plate which automatically collapses or folds the swing frame of the luggage cart when the cart is inserted or moved into the stall and the swing frame of the cart is in a forwardly-extending position. The stall has guide and receiving portions which assure a proper alignment of the handle portion of the cart within the fingers of the coin-operated latching mechanism.

The luggage cart of my invention has its axle shaft and wheels mounted in a transversely-forwardly offset relationship with the longitudinal plane of its main frame, such that they are beneath or in substantial longitudinal alignment with the secondary or luggage support frame and in back of the swing frame when it is in its transversely-extended position. This provides the cart with a center of gravity that is in substantial alignment with the center of gravity of the luggage being carried and makes the cart more efficient and effective in utilization. It is easy to operate, since it can be operated at a tilted natural angle to the vertical of about 30°, plus or minus, when loaded with luggage. As shown, the spaced-apart legs of the main frame are bent or curved transversely-forwardly at their lower ends to mount the axle shaft of the wheels, the secondary or shelf frame extends above and downwardly in front of the wheels, and the spaced-apart legs of the swing frame are turned or bent upwardly at their ends and operate within the space defined by legs of the shelf frame to move to a collapsed position. The construction of the cart permits it to freely stand in an upright position while it is being loaded and unloaded.

It will be noted from Figures 2, 6 and 7 that the tread portion of the secondary or fixed support frame 26 lies on a transverse plane at substantially right angles to the longitudinal plane of the main frame 21, that the riser portion of the secondary frame 26 lies on a longitudinal plane that is transversely-forwardly of and substantially parallel to the longitudinal plane of the main frame 21, and that the swing frame 28 lies on a transverse plane that is substantially parallel but downwardly-offset with respect to the transverse plane of the tread portion of the secondary frame 26 and is thus, at right angles to the longitudinal plane of the main frame 21. It will also be noted that the swing frame 28, when in its collapsed position of Figures 2 and 6, lies substantially on a plane that is spaced forwardly of and substantially parallel to the longitudinal plane of the main frame 21. The construction is such that the weight distribution of the cart 20, when loaded and tilted to a natural operating angle, will be substantially equal on and from each side of a vertical center line through the axis of the wheels. This makes the cart easy to handle, push and pull, and facilitates its movement up and down steps and escalators.

What I claim is:

1. An improved luggage cart for use in a luggage servicing system which comprises, a main frame having a pair of spaced-apart legs extending in a substantially longitudinal plane and connected at an upper end thereof to define a handle portion, said legs having lower portions projecting forwardly of such longitudinal plane at the opposite end of said main frame, an axle shaft extending through the opposite end portions of said legs adjacent their ends and secured thereto, a pair of wheels journaled on said axle shaft for moving the cart from one location to another, a secondary frame of skeleton construction having spaced-apart legs that define a step portion projecting forwardly of such longitudinal plane and a riser portion projecting downwardly from said step portion, said secondary frame being joined at its upper end to the legs of said main frame above said lower portions thereof, said secondary frame being joined at its lower end to said lower portions of said main frame; a swing frame having forwardly-extending legs in a spaced-apart relationship with each other and at a forward end thereof being connected together by a transverse member and, at an opposite end thereof, extending between the legs of said secondary frame and being pivotally mounted on said axle shaft; and end portions of the legs of said swing frame being curved upwardly from an intermediate portion of said swing frame.

2. An improved luggage cart as defined in claim 1 wherein, luggage-supporting cross members are mounted on the legs of said main frame, said step portion of said secondary frame, and the forwardly-extending legs of said swing frame to support luggage thereon.

3. An improved luggage cart for use in a luggage servicing system which comprises, a main frame defining a handle portion at one end thereof, axle means mounted on said frame adjacent the opposite end thereof and having a pair of wheels operatively positioned thereon for moving the cart from one location to another, a secondary frame joined to said main frame at the opposite end thereof to extend forwardly thereof, said secondary frame having a shelf portion terminating in a forward riser portion, a swing frame extending forwardly of said main and secondary frames and having a backwardly-upwardly curved inner end portion extending through said riser portion, and means pivotally mounting the curved inner end portion of said swing frame on said axle means to move said swing frame from a horizontally-forwardly and vertically-offset relationship with respect to said shelf portion to an upwardly-extending relationship therewith.

4. An improved luggage cart for use in a luggage servicing system which comprises, a main frame having a handle portion on a substantially vertical plane and also having a lower forwardly-projecting front end portion; a secondary frame joined to said main frame and extending forwardly over said front end portion, an axle shaft mounted to extend transversely on said front end portion of said main frame in substantial transverse alignment